United States Patent
Roseman

(10) Patent No.: US 8,678,289 B2
(45) Date of Patent: Mar. 25, 2014

(54) ANTI-TAMPER LABEL AND ITEM EMBODYING THE SAME

(75) Inventor: Morton F. Roseman, Thornhill (CA)

(73) Assignee: Custom Security Industries Inc., Thornhill, Ontario (CA)

( * ) Notice: Subject to any disclaimer, the term of this patent is extended or adjusted under 35 U.S.C. 154(b) by 0 days.

(21) Appl. No.: 13/445,487

(22) Filed: Apr. 12, 2012

(65) Prior Publication Data

US 2012/0280043 A1    Nov. 8, 2012

Related U.S. Application Data

(60) Provisional application No. 61/474,534, filed on Apr. 12, 2011.

(51) Int. Cl.
*G06K 19/02*    (2006.01)

(52) U.S. Cl.
USPC .......................................................... 235/488

(58) Field of Classification Search
USPC .......................................................... 235/488
See application file for complete search history.

(56) References Cited

U.S. PATENT DOCUMENTS

| | | | |
|---|---|---|---|
| 5,660,925 A * | 8/1997 | Cooley et al. | 428/304.4 |
| 7,095,324 B2 * | 8/2006 | Conwell et al. | 340/572.1 |
| 8,360,323 B2 * | 1/2013 | Widzinski et al. | 235/488 |
| 2005/0076833 A1 * | 4/2005 | Wechselberger et al. | 118/505 |
| 2012/0040113 A1 * | 2/2012 | Sato et al. | 428/34.1 |

* cited by examiner

*Primary Examiner* — Seung Lee
(74) *Attorney, Agent, or Firm* — Faegre Baker Daniels LLP

(57) ABSTRACT

An anti-tamper label comprises a core; an adhesive layer disposed on one side of the core; and an adhesion-resistant layer disposed on the other side of the core.

26 Claims, 2 Drawing Sheets

ANTI-TAMPER LABEL AND ITEM EMBODYING THE SAME

CROSS-REFERENCE TO RELATED APPLICATIONS

This application claims the benefit of U.S. Provisional Application No. 61/474,534 filed on Apr. 12, 2011, entitled "ANTI-TAMPER LABEL AND METHOD OF USE THEREOF", the entire content of which is incorporated herein by reference.

FIELD OF THE INVENTION

The present invention relates to an anti-tamper label and an item embodying the same.

BACKGROUND OF THE INVENTION

Shoplifting is a problem faced by almost all retailers. It is however not the only form of criminal "theft" activity faced by retailers. Retail fraud, such as gift card fraud, barcode fraud and return fraud is also a common problem among retailers. Barcode fraud takes various forms, one of which is the surreptitious transfer a barcode label from a lower priced item of merchandise to a higher priced item of merchandise. Another form of barcode fraud involves replacing an original barcode label with a custom-made barcode label associated with a lower price. This particular form of barcode fraud involves capturing an image of a legitimate barcode from an actual, lower priced item of merchandise, and using readily available software and printers to produce an authentic looking barcode label, which is then placed over the barcode on a higher priced item of merchandise.

Detection of barcode fraud is sometimes possible at checkout counters, if the checkout counter staff scrutinize the barcodes or barcode labels when scanning the barcodes or if the checkout counter staff verify that the reported prices and/or the descriptions associated with the scanned barcodes reasonably correspond to the items of merchandise before them. However, with the proliferation of self-checkout counters, there exists no easy way for retail staff to perform any such verification in an expeditious manner, while maintaining the purported efficiency of self-checkout counters. Although some retailers place staff near the self-checkout counters in an attempt to detect customers buying expensive items of merchandise at suspiciously low prices, the levels of detection of barcode fraud are generally relatively low.

Several methods have been proposed for countering barcode fraud. For example, U.S. Pat. No. 7,909,363, to Anderson discloses a label which deters removal from one product for application on another product. The label comprises three parts separated by separation lines, two of which have pull tabs to allow them to be easily removed, while the third part is a narrow strip between the separation lines that does not have a pull tab. When the label parts that have pull tabs are lifted off the product, the label separates at the separation lines, leaving the third narrow strip on the product, and any attempt to reconstruct the label after it has been removed from the product is futile. In other embodiments, the label has two parts made of material that stretches when the parts are removed from a product. The stretching distorts a barcode graphic printed on the label making the barcode unreadable.

U.S. Pat. No. 6,447,014 to Seidl discloses a multilayer label comprising at least one authenticity feature which consists of at least two parts positioned on different layers of the label. The barcode can have m lines of which n lines are arranged on one layer (1) of the label and m-n lines are arranged on another layer of the label, where m>n>0. The label can have a lower layer and an upper layer with the lower layer having a greater surface area than the at least one layer positioned on top of it. The upper side and/or lower side of at least one of the layers can be coated with an adhesive at least in sections and/or at least in points.

U.S. Pat. No. 6,869,015 to Cummings et al. discloses a tamper-indicating barcode methodology that allows for detection of alteration to a barcode. The tamper-indicating methodology makes use of a tamper-indicating means comprising a particulate indicator, an optical indicator, a deformable substrate, and/or may be an integrated aspect of the barcode itself.

U.S. Pat. No. 7,095,324 to Conwell et al. discloses a tamper evident smart label with an RFID or RF transponder. Use of tamper evident label materials in the layered construction of the smart label prevents removal, transferal, replacement and/or alteration of the smart label without noticeable evidence of tampering. Visible patterns, holograms and/or microprinting are incorporated to increase label tampering visibility.

As will be appreciated from the above, although attempts to counter barcode fraud have been considered, improvements are desired. It is therefore an object to provide a novel anti-tamper label and a novel item embodying the same.

SUMMARY OF THE INVENTION

Accordingly, in one aspect, there is provided an anti-tamper label comprising: a core; an adhesive layer disposed on one side of said core; and an adhesion-resistant layer disposed on the other side of said core.

In one embodiment, the core, the adhesive layer and the adhesion-resistant layer are substantially transparent. The core may have indicia thereon. The indicia in one form is in a pattern to facilitate determination of the integrity of the label.

In one embodiment, the core comprises a single layer of material formed of polyethylene terephthalate, acetate, bi-axially oriented polypropylene or other suitable material. In another embodiment, the core layer comprises at least two layers of material wherein each layer of material is formed of polyethylene terephthalate, acetate, bi-axially oriented polypropylene or other suitable material.

In one embodiment, the core has a functional device thereon. The functional device may be selected from radio frequency identification devices, electromagnetic devices, acousto-magnetic devices, radio-frequency devices and microwave devices.

According to another aspect there is provided an item having machine-readable code associated therewith and an anti-tamper label overlying the machine-readable code, the anti-tamper label comprising: a core having recognizable indicia thereon; an adhesive layer disposed on one side of said core affixing said anti-tamper label to said item; and an adhesion-resistant layer disposed on the other side of said core.

BRIEF DESCRIPTION OF THE DRAWINGS

Embodiments will now be described more fully with reference to the accompanying drawings in which.

DETAILED DESCRIPTION OF THE EMBODIMENTS

Figure 1:
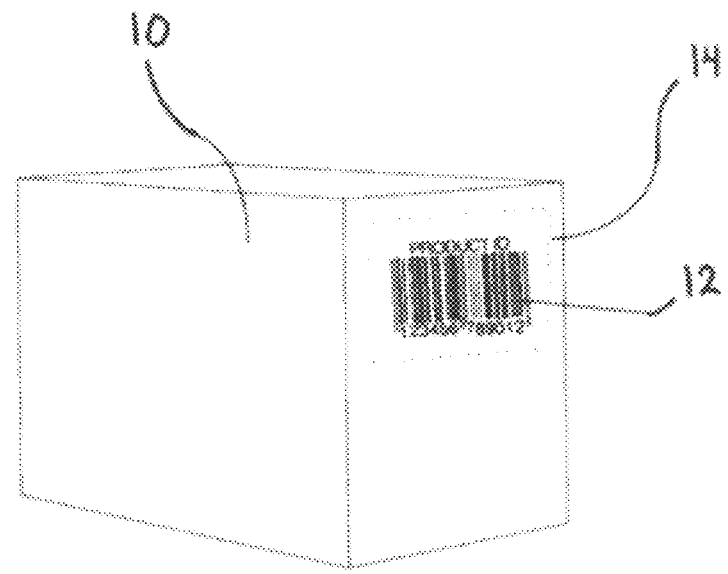
FIG. 1 is a perspective view of an item of merchandise having an anti-tamper label applied thereto that overlies a barcode associated with the item of merchandise.

Turning now to FIG. 1, an item of merchandise 10 having a barcode 12 associated therewith is shown. The barcode 12 may be printed directly on the item of merchandise 10, may be printed directly on packaging associated with the item of merchandise 10, or may be printed on a label for placement on the item of merchandise 10 or on packaging associated with the item of merchandise 10. A substantially transparent, anti-tamper label generally identified by reference numeral 14 for deterring and/or reducing barcode fraud is applied over the barcode 12. In this embodiment, the anti-tamper label 10 is dimensioned such that it completely covers the barcode 12.

Figure 2:
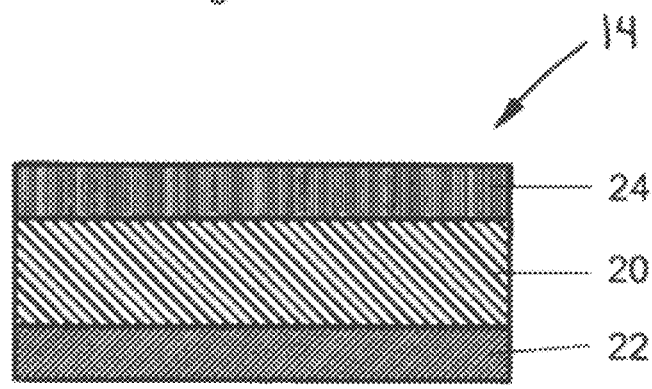
FIG. 2 is a cross-sectional view of the anti-tamper label of FIG. 1.

As shown in FIG. 2, the anti-tamper label 14 comprises a core 20, an adhesive layer 22 disposed on one side of core layer 20 and an adhesion-resistant layer 24 disposed on the other side of the core 20. In this embodiment, the core 20 is formed of polyethylene terephthalate ("PET"). However other suitable substantially transparent materials, such as, acetate, bi-axially oriented polypropylene (BOPP) etc. may be used. The adhesive layer 22 is selected such that anti-tamper label 14 forms a strong and substantially irremovably-secure bond with the item of merchandise 10. As a result, if an attempt to remove the anti-tamper label 14 from the item of merchandise 10 or its packaging is made, noticeable damage to the barcode 12 and/or the item of merchandise 10 or its packaging occurs. Adhesion-resistant layer 24 in this embodiment is formed of silicone or other suitable substantially transparent material that resists adhesion thereto.

The anti-tamper label 14 further comprises indicia (not shown), such as one or more graphics, text, a quick response (QR) code, etc. The indicia are printed on the bottom surface of the core 20 prior to the application of the adhesive layer 22 thereon and are chosen such that the characteristics thereof may be readily ascertained when the anti-tamper label 14 is affixed over the barcode 12 associated with the item of merchandise 10 without interfering with the normal functions of the optical reader when scanning the underlying barcode 12. As such, the printing inks and the printing process used are chosen to ensure high visibility of the indicia to the retail staff and transparency to the optical scanner. The indicia may run continuously along the length and/or width of the anti-tamper label 14, or along the perimeter of the anti-tamper label 14. In general the indicia are printed in a pattern that facilitates visual detection of any disruptions of the indicia.

In use, the anti-tamper label 14 is affixed over the barcode 12 associated with the item of merchandise 10. Due to the adhesion characteristics of the adhesive layer 22, any attempt to remove the anti-tamper label 14 results in damage to the item of merchandise 10, its packaging and/or the barcode 12, thus rendering the barcode 12 unreadable by the optical reader. Thus, signs of the attempted or actual label removal are clearly visible. The adhesion-resistant layer 24 is also configured to foil any attempt to mount a fraudulent barcode label over the anti-tamper label 14. When a fraudulent barcode label is applied over the anti-tamper label 14, the extremely low adhesion qualities of layer 24 results in a weak and unsustainable bond being formed between the fraudulent barcode label and the anti-tamper label 14. As a result the fraudulent barcode label inevitable changes orientation on the item of merchandise 10 while in transit to the checkout counter, or while the item of merchandise 10 is manually handled to read the fraudulent barcode label at checkout. The misoriented fraudulent barcode label thus can be readily detected by retail staff, red-flagging the fraudulent activity. Furthermore, the weak bond between the fraudulent barcode label and the anti-tamper label 14 may simply result in the fraudulent barcode label losing contact with the anti-tamper label 10 and falling off, which results in the legitimate barcode 12 being read at the checkout counter, much to the chagrin of the unwitting fraudster. Furthermore, should a fraudulent barcode label be placed over the anti-tamper label 14, the indicia printed on the core 20 will typically be occluded by the fraudulent barcode label providing another visible indicator to retail staff of attempted fraud.

Figure 3:
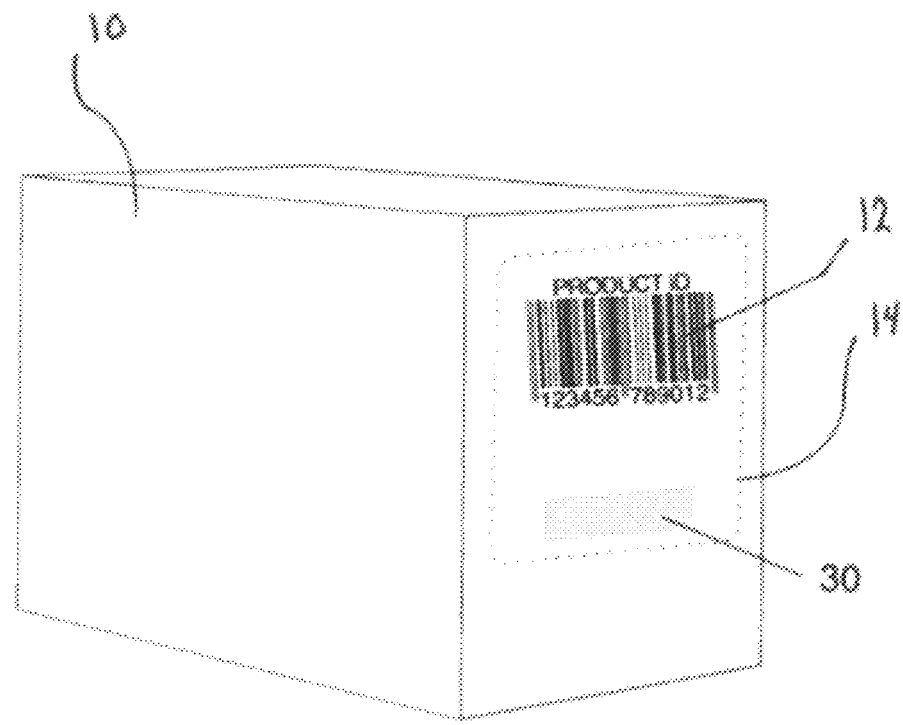
FIG. 3 is a perspective view of an item of merchandise having an alternative anti-tamper label applied thereto that overlies a barcode associated with the item of merchandise.

In another embodiment, the anti-tamper label 14 may further comprise at least one functional device 30 that is applied to the top and/or bottom surface of the core 20 prior to application of the adhesive layer 22 or adhesion-resistant layer 24 and that is transparent to an optical reader, as shown in FIG. 3. The functional device 30 can be any device or any sensor such as, but not limited to, radio frequency identification (RFID) devices and electronic article surveillance (EAS) devices (commonly known as "anti-theft" or "anti-shoplifting" devices), such as electromagnetic (EM), acousto-magnetic (AM), radio-frequency (RF), and microwave (MW) devices. Such functional devices include, but are not limited to, radio-frequency identification (RFID) labels, such as those manufactured by UPM Raflatac of Fletcher, N.C. and Checkpoint Systems, Inc. of Thorofare, N.J.; acousto-magnetic (AM) labels, such as those manufactured by Tyco International, Ltd. of Princeton, N.J.; and radio-frequency (RF) labels, such as those manufactured by ALL-TAG Security of Boca Raton, Fla., and by Checkpoint Systems, Ltd.

Figure 4:
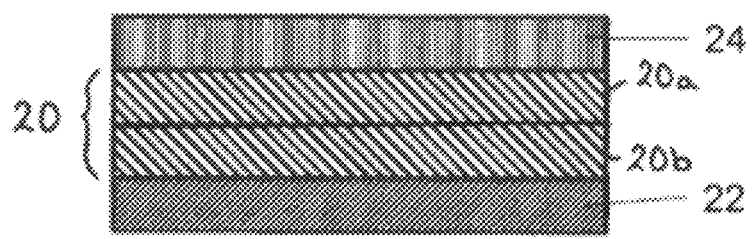
FIG. 4 is a cross-sectional view of yet another embodiment of an anti-tamper label.

Turning now to FIG. 4, yet another embodiment of a substantially transparent anti-tamper label 14 is shown. As can be seen, the anti-tamper label 14 similarly comprises a core 20, an adhesive layer 22 disposed on one side of the core 20 and an adhesion-resistant material layer 24 disposed on the other side of the core 20. The core 20 is formed of polyethylene terephthalate ("PET") or other suitable substantially transparent material such as, acetate, bi-axially oriented polypropylene (BOPP) etc. In this embodiment however, rather than being formed of a single layer of material, the core 20 comprises two layers 20a and 20b that are laminated to form the core.

As shown, the adhesive layer 22 is disposed on the top surface of the layer 20b and the adhesion-resistant layer 24 is disposed on the bottom surface of the layer 20a. The indicia are printed on the top surface of the layer 20a and/or on the bottom surface of layer 20b. In this manner, the adhesive and adhesion-resistant layers can be applied to the core layers prior to the application of the indicia thereby simplifying the anti-tamper label manufacturing process.

Although the anti-tamper label has been described as being dimensioned such that it completely covers the barcode 12, the anti-tamper label may be dimensioned to cover only a portion of the barcode. Also, the anti-tamper label may be configured such that it is only substantially transparent in the region thereof directly overlying the barcode. While specific materials for the various layers of the anti-tamper label have been described, those of skill in the art will appreciate that other suitable materials may be used.

Although embodiments have been described above with reference to the accompanying drawings, those of skill in the art will appreciate that variations and modifications may be made without departing from the scope thereof as defined by the appended claims.

What is claimed is:

1. An anti-tamper label for adherence to an item at a location thereon overlying a machine-readable code on said item, said anti-tamper label being substantially transparent so that said machine-readable code is visible through said anti-tamper label and comprising:
    a core;
    an adhesive layer disposed on one side of said core, said adhesive layer having strong adhesive characteristics such that attempted removal of said anti-tamper label from said item results in damage to said item and/or machine-readable code; and
    an adhesion-resistant layer disposed on the other side of said core, said adhesion-resistant layer having very low adhesion characteristics to inhibit another label from adhering thereto and obscuring said machine-readable code.

2. The anti-tamper label of claim 1 wherein said core has indicia thereon.

3. The anti-tamper label of claim 2 wherein said indicia is in a pattern to facilitate determination of the integrity of said anti-tamper label.

4. The anti-tamper label of claim 1 wherein said core comprises a single layer of material.

5. The anti-tamper label of claim 4 wherein said single layer of material is formed of polyethylene terephthalate, acetate, bi-axially oriented polypropylene or other suitable material.

6. The anti-tamper label of claim 5 wherein said core has indicia thereon.

7. The anti-tamper label of claim 6 wherein said indicia is in a pattern to facilitate determination of the integrity of said anti-tamper label.

8. The anti-tamper label of claim 1 wherein said core layer comprises at least two layers of material.

9. The anti-tamper label of claim 8 wherein each layer of material is formed of polyethylene terephthalate, acetate, bi-axially oriented polypropylene or other suitable material.

10. The anti-tamper label of claim 9 wherein said core has indicia thereon.

11. The anti-tamper label of claim 10 wherein said indicia is in a pattern to facilitate determination of the integrity of said anti-tamper label.

12. The anti-tamper label of claim 1 wherein said core has a functional device thereon.

13. The anti-tamper label of claim 12 wherein said functional device is selected from radio frequency identification (RFID) devices, electromagnetic (EM) devices, acousto-magnetic (AM) devices, radio-frequency (RF) devices, and microwave (MW) devices.

14. The anti-tamper label of claim 1 wherein said adhesion-resistant layer comprises silicon.

15. An item having machine-readable code associated therewith and a substantially transparent anti-tamper label adhered to said item and overlying the machine-readable code, the anti-tamper label comprising:
    a core having recognizable indicia thereon;
    an adhesive layer disposed on one side of said core adhering said anti-tamper label to said item, said adhesive layer having strong adhesive characteristics to form a substantially irremovably-secure bond with said item such that attempted removal of said anti-tamper label from said item results in damage to said item and/or machine-readable code; and
    an adhesion-resistant layer disposed on the other side of said core, said adhesion-resistant layer having very low adhesion characteristics to inhibit another label from adhering to said anti-tamper label and obscuring said machine-readable code.

16. The item of claim 15 wherein said machine-readable code is a barcode.

17. The item of claim 16 wherein said barcode is a universal product code (UPC) or a two-dimensional code.

18. The item of claim 16 wherein said anti-tamper label completely overlies said barcode.

19. The item of claim 15 wherein said indicia is in a pattern to facilitate determination of the integrity of said anti-tamper label.

20. The item of claim 15 wherein said core has a functional device thereon.

21. The item of claim 20 wherein said functional device is selected from radio frequency identification (RFID) devices, electromagnetic (EM) devices, acousto-magnetic (AM) devices, radio-frequency (RF) devices, and microwave (MW) devices.

22. The item of claim 15 wherein said core comprises a single layer of material.

23. The item of claim 22 wherein said single layer of material is formed of polyethylene terephthalate, acetate, bi-axially oriented polypropylene or other suitable material.

24. The item of claim 15 wherein said core layer comprises at least two layers of material.

25. The item of claim 24 wherein each layer of material is formed of polyethylene terephthalate, acetate, bi-axially oriented polypropylene or other suitable material.

26. The item of claim 15 wherein said adhesion-resistant layer comprises silicon.

* * * * *